US012488916B2

(12) United States Patent

Liu et al.

(10) Patent No.: US 12,488,916 B2
(45) Date of Patent: Dec. 2, 2025

(54) OVER-CURRENT PROTECTION DEVICE

(71) Applicant: Polytronics Technology Corp., Hsinchu (TW)

(72) Inventors: Chen-Nan Liu, Changhua County (TW); Yung-Hsien Chang, Douliu (TW); Cheng-Yu Tung, Tainan (TW); Hsiu-Che Yen, Taoyuan (TW); Chia-Yuan Lee, Hsinchu (TW); Yao-Te Chang, Yunlin County (TW); Fu-Hua Chu, Taipei (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 385 days.

(21) Appl. No.: 18/295,919

(22) Filed: Apr. 5, 2023

(65) Prior Publication Data

US 2024/0145133 A1 May 2, 2024

(30) Foreign Application Priority Data

Oct. 28, 2022 (TW) .................................. 111141219

(51) Int. Cl.
*H01C 7/02* (2006.01)
*H01C 7/13* (2006.01)

(52) U.S. Cl.
CPC ............. *H01C 7/028* (2013.01); *H01C 7/021* (2013.01); *H01C 7/13* (2013.01)

(58) Field of Classification Search
CPC ........... H01C 7/028; H01C 7/021; H01C 7/13
See application file for complete search history.

(56) References Cited

U.S. PATENT DOCUMENTS

| | | | | |
|---|---|---|---|---|
| 6,143,206 A * | 11/2000 | Handa | H01C 7/027 252/511 |
| 2002/0145130 A1* | 10/2002 | Handa | H01C 17/06586 252/500 |
| 2019/0096621 A1* | 3/2019 | Chen | H01H 85/06 |
| 2023/0395287 A1* | 12/2023 | Liu | H01C 1/1406 |

FOREIGN PATENT DOCUMENTS

| | | | |
|---|---|---|---|
| CN | 103247399 A | | 8/2013 |
| JP | 2007005547 | * | 1/2007 |
| TW | 464883 B | | 11/2001 |
| TW | 200926211 A | | 6/2009 |
| TW | 201802836 A | | 1/2018 |
| TW | 202024212 A | | 7/2020 |
| TW | 202138445 A | | 10/2021 |

OTHER PUBLICATIONS

JP-2007005547 translation (Year: 2007).*

* cited by examiner

*Primary Examiner* — Kyung S Lee
(74) *Attorney, Agent, or Firm* — MUNCY, GEISSLER, OLDS & LOWE, P.C.

(57) ABSTRACT

An over-current protection device includes a first metal layer, a second metal layer and a heat-sensitive layer laminated therebetween. The heat-sensitive layer exhibits a positive temperature coefficient (PTC) characteristic and includes a polymer matrix and a first conductive filler. The polymer matrix includes a polyolefin-based polymer and a fluoropolymer. The fluoropolymer has a melt flow index higher than 1.9 g/10 min, and the polyolefin-based polymer and the fluoropolymer together form an interpenetrating polymer network (IPN). The first conductive filler has a metal-ceramic compound dispersed in the polymer matrix.

12 Claims, 1 Drawing Sheet

OVER-CURRENT PROTECTION DEVICE

BACKGROUND OF THE INVENTION

(1) Field of the Invention

The present application relates to an over-current protection device, and more specifically, to an over-current protection device having low electrical resistivity and excellent voltage endurance capability.

(2) Description of the Related Art

Because the electrical resistance of conductive composite materials having a positive temperature coefficient (PTC) characteristic is very sensitive to temperature variation, they can be used as the materials for current sensing devices and have been widely applied to over-current protection devices or circuit devices. More specifically, the electrical resistance of the PTC conductive composite material remains extremely low at normal temperatures, so that the circuit or cell can operate normally. However, when an over-current or an over-temperature situation occurs in the circuit or cell, the electrical resistance will instantaneously increase to a high electrical resistance state (e.g., at least above $10^4\Omega$), which is the so-called "trip". Therefore, the over-current will be eliminated so as to protect the cell or the circuit device.

The basic structure of the over-current protection device consists of a PTC material layer with two electrodes bonded to two opposite sides of the PTC material layer. The PTC material layer includes a matrix and a conductive filler. The matrix generally consists of one or more polymers, and the conductive filler is uniformly dispersed in the matrix and is used as an electrically conductive path. When it comes to over-temperature protection, many electronic apparatuses need to be protected at 120° C., and therefore polyethylene is often selected to be the polymer matrix in the over-current protection device because its trip temperature is also about 120° C. In addition, in order to have better electrical conduction under the condition without tripping, the conductive filler may include a metal-containing material as its major constituent and therefore the over-current protection device allows more current to flow, by which the over-current protection device with low electrical resistivity (referred to as "LR over-current protection device" hereinafter) can be made. Conventionally, minor amount of a polymer with a high melting point (e.g., polyvinylidene difluoride which has a melting point higher than that of polyethylene) would be added to the LR over-current protection device to increase thermal stability and enhance voltage endurance capability while keeping from affecting the trip temperature. After that, additional additives are always needed if one would like to further improve the voltage endurance capability of the over-current protection device. However, the additional additives usually make the formulation design complicated. For example, compatibility between the additional additives, polymers, and the conductive filler must be taken into consideration; after considering the compatibility and deciding desirable additives, the proportion between the polymers and the conductive filler needs to be adjusted properly in order to maintain excellent electric characteristics. In the time of fast-changing technologies, the formulation is frequently improved on the prior basis. However, the more compounds the formulation has, the more complex the formulation design is.

Accordingly, there is a need to improve the voltage endurance capability of the LR over-current protection device.

SUMMARY OF THE INVENTION

The present invention provides an "LR over-current protection device." Moreover, the concept of interpenetrating polymer networks (IPN) is introduced, thereby improving the voltage endurance capability of the LR over-current protection device.

In accordance with an aspect of the present invention, an over-current protection device includes a first metal layer, a second metal layer, and a heat-sensitive layer laminated between the first metal layer and the second metal layer. The heat-sensitive layer exhibits a positive temperature coefficient (PTC) characteristic, and includes a polymer matrix and a first conductive filler. The polymer matrix includes a polyolefin-based polymer and a fluoropolymer. The fluoropolymer has a melt flow index higher than 1.9 g/10 min, and the polyolefin-based polymer and the fluoropolymer together form an interpenetrating polymer network (IPN). The first conductive filler has an electrical resistivity lower than 500 μΩ·cm and is dispersed in the polymer matrix, thereby forming an electrically conductive path in the heat-sensitive layer.

In an embodiment, the melt flow index of the fluoropolymer ranges from 1.9 g/10 min to 30 g/10 min.

In an embodiment, the total volume of the heat-sensitive layer is calculated as 100%, and the polyolefin-based polymer accounts for 42% to 51% and the fluoropolymer accounts for 2% to 11% by volume of the heat-sensitive layer.

In an embodiment, the total volume of the heat-sensitive layer is calculated as 100%, and the polymer matrix accounts for 50% to 60% by volume of the heat-sensitive layer.

In an embodiment, the polyolefin-based polymer is selected from the group consisting of high-density polyethylene (HDPE), medium-density polyethylene (MDPE), low-density polyethylene (LDPE), polyvinyl wax, vinyl polymer, polypropylene, polybutene, polyvinyl chlorine, and mixture or copolymer of combinations thereof.

In an embodiment, the fluoropolymer is selected from the group consisting of polyvinylidene difluoride, polytetrafluoroethene, ethylene-tetrafluoro ethylene copolymer, tetrafluoroethylene-hexafluoro-propylene copolymer, perfluoroalkoxy modified tetrafluoroethylenes, poly(chlorotrifluorotetrafluoroethylene), vinylidene fluoride-tetrafluoroethylene copolymer, tetrafluoroethylene-perfluorodioxole copolymer, vinylidene fluoride-hexafluoropropylene copolymer, and vinylidene fluoride-hexafluoropropylene-tetrafluoroethylene terpolymer, and mixture or copolymer of combinations thereof.

In an embodiment, the first conductive filler is a metal-ceramic compound. The total volume of the heat-sensitive layer is calculated as 100%, and the metal-ceramic compound accounts for 35% to 45% by volume and is selected from the group consisting of tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride, zirconium nitride, and any combination thereof.

In an embodiment, the heat-sensitive layer further includes a second conductive filler, and the second conductive filler is carbon black. The total volume of the heat-sensitive layer is calculated as 100%, and the carbon black accounts for 4% to 6% by volume of the heat-sensitive layer.

In an embodiment, the over-current protection device further includes a flame retardant. The flame retardant consists of a non-metal nitride. The total volume of the heat-sensitive layer is calculated as 100%, and the flame retardant accounts for 1% to 3% by volume of the heat-sensitive layer.

In an embodiment, the flame retardant is boron nitride.

In an embodiment, the over-current protection device has an electrical resistivity (ρ) ranging from 0.015 Ω·cm to 0.019 Ω·cm.

In an embodiment, the over-current protection device has a first electrical characteristic. The first electrical characteristic is a voltage-endurance value of at least 48V.

In an embodiment, the over-current protection device has a second electrical characteristic. The second electrical characteristic is a ratio of resistance jump ranging from 4.8 to 6.2.

In an embodiment, the over-current protection device has a third electrical characteristic. The third electrical characteristic is an endurable power per unit area ranging from 6.7 $W/mm^2$ to 7.5 $W/mm^2$.

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Figure 1:
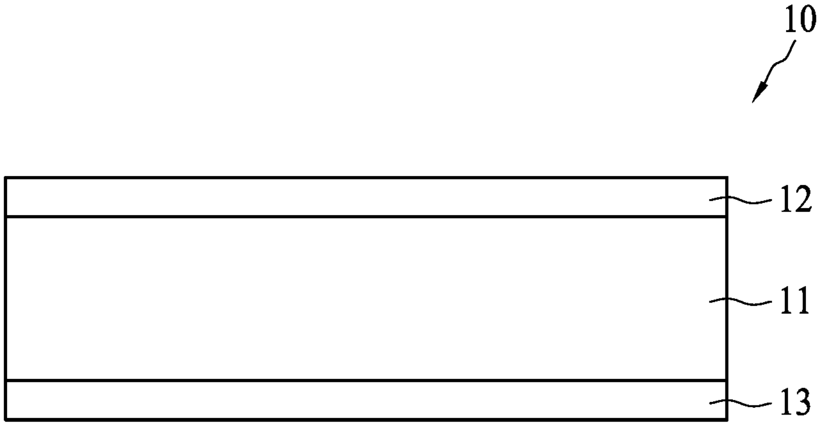
FIG. 1 shows a cross-sectional view of an over-current protection device in accordance with an embodiment of the present invention.

Please refer to FIG. 1. FIG. 1 shows one basic aspect of an over-current protection device 10 of the present invention in cross-sectional view. The over-current protection device 10 includes a first metal layer 12, a second metal layer 13, and a heat-sensitive layer 11 laminated between the first metal layer 12 and the second metal layer 13. In an embodiment, the first metal layer 12 and the second metal layer 13 may be composed of the nickel-plated copper foils or other conductive metals. The heat-sensitive layer 11 exhibits a positive temperature coefficient (PTC) characteristic and includes a polymer matrix and a first conductive filler. The first conductive filler has a metal-ceramic compound and is dispersed in the polymer matrix, thereby forming an electrically conductive path in the heat-sensitive layer 11. It is noted that in the present invention, the heat-sensitive layer 11 is a PTC material layer exhibiting the PTC characteristic; and in order to reduce electrical resistivity of the over-current protection device 10, the first conductive filler has the electrical resistivity lower than 500 μΩ·cm. For example, the first conductive filler may be a metal-ceramic compound, a metal, a metal alloy, or mixture of combinations thereof. In other words, the present invention focuses on the improvement of the over-current protection device with low electrical resistivity. The "over-current protection device with low electrical resistivity" is referred to as "LR over-current protection device", as mentioned above. The "LR" stands for low rho (ρ), which means low electrical resistivity.

In the heat-sensitive layer 11, the polymer matrix includes a polyolefin-based polymer and a fluoropolymer. The present invention selects the polyolefin-based polymer, which has a lower melting point, as the major constituent of the polymer matrix; and selects the fluoropolymer, which has a higher melting point, as the minor constituent of the polymer matrix. The melt flow index of the fluoropolymer is controlled to be higher than 1.9 g/10 min so that the polyolefin-based polymer and the fluoropolymer together form an excellent network structure, that is, an interpenetrating polymer network (IPN), and the trip current or trip temperature remains unaffected. With the help of IPN, structural stability of the heat-sensitive layer 11 can be enhanced, and hence the over-current protection device 10 is less prone to deformation by the trip event. In the meantime, voltage endurance capability of the over-current protection device 10 is also enhanced.

More specifically, melt flow index is also referred to as "melt flow rate", which is defined as the weight of a polymer in unit of gram flowing in 10 minutes through a capillary, and can be used to assess the flowability of the polymer in the melted state. The higher the melt flow index is, the better the flowability will be. Conversely, the lower the melt flow index is, the poorer the flowability will be. The melt flow index is measured at 230° C. in accordance with the standard of ASTM D1238, and the melt flow index of the fluoropolymer ranges from 1.9 g/10 min to 30 g/10 min. If the melt flow index of the fluoropolymer is lower than 1.9 g/10 min, the flowability of the fluoropolymer is poor under high temperature, thereby causing phase separation between the polyolefin-based polymer and the fluoropolymer. More specifically, the fluoropolymer is unevenly dispersed due to poor flowability during blending between the polyolefin-based polymer and the fluoropolymer under high temperature. Because of the uneven dispersion, a part of the polyolefin-based polymer is mostly distributed in one region, and a part of the fluoropolymer is mostly distributed in another region. During the process of crosslinking, each of them may form its own network rather than a network that the polyolefin-based polymer and the fluoropolymer interpenetrate each other (i.e., IPN). It is understood that IPN is a stable network structure in which the polyolefin-based polymer and the fluoropolymer are tangled with each other, and the mobility of them is quite restricted. In this way, IPN is helpful in stabilizing two different polymers in a system, and allows them to be compatible with each other. In the absence of IPN, phase separation between the polyolefin-based polymer and the fluoropolymer occurs. In addition, if the melt flow index of the fluoropolymer is higher than 30 g/10 min, there is also the issue of phase separation due to the high flowability of the fluoropolymer. Such excellent flowability suggests that the fluoropolymer contains more short-chain molecules, because the mobility of the short-chain molecule is better than that of the long-chain molecule. However, the short-chain molecule has a shorter length, and lots of the short-chain molecules are too short to efficiently form crosslinks. The probability of crosslinking is largely reduced due to abundance of the short-chain molecules. Under this situation, it is difficult to form the structure of IPN even though the fluoropolymer is evenly and well mixed with the polyolefin-based polymer. In other words, it is unfavorable to the present invention if the melt flow index of the fluoropolymer is too high or too low, both of which may lead to the issue of phase separation, and it is difficult or unable to form the structure of IPN.

As described above, the polyolefin-based polymer is the major constituent of the polymer matrix, and the fluoropolymer is the minor constituent of the polymer matrix. Accordingly, the present invention is mainly applied to the apparatuses to be protected at low temperature (about 110° C. to 140° C.), and the fluoropolymer, which has the higher melting point, should not be added too much. In the present invention, the total volume of the heat-sensitive layer 11 is calculated as 100%, and the polyolefin-based polymer accounts for 42% to 51% and the fluoropolymer accounts for 2% to 11% by volume of the heat-sensitive layer 11. Moreover, in order to trigger the trip action, the polymer matrix preferably accounts for at least half the heat-sensitive layer 11 by volume, such as 50% to 60% by volume of the heat-sensitive layer 11. In an embodiment, the volume of the polymer matrix is calculated as 100%, and the polyolefin-based polymer accounts for 78% to 97% and the fluoropolymer accounts for 3% to 22% by volume of the polymer matrix. In a preferred embodiment, the volume of the polymer matrix is calculated as 100%, and the polyolefin-based polymer accounts for 81% to 95% and the fluoropolymer accounts for 5% to 19% by volume of the polymer matrix. If the fluoropolymer accounts for less than 5% by volume of the polymer matrix, the amount of the fluoropolymer is too low to effectively form the structure for IPN. If the fluoropolymer accounts for higher than 19% by volume of the polymer matrix, the trip temperature of the over-current protection device is correspondingly elevated to a higher temperature point; and therefore it cannot be applied to the aforementioned apparatuses to be protected at low temperature.

In the present invention, the polyolefin-based polymer is selected from the group consisting of high-density polyethylene (HDPE), medium-density polyethylene (MDPE), low-density polyethylene (LDPE), polyvinyl wax, vinyl polymer, polypropylene, polybutene, polyvinyl chlorine, and mixture or copolymer of combinations thereof. In an embodiment, the polyolefin-based polymer may be selected based on the protection temperature. For example, LDPE has a lower melting point and can be selected for lower protection temperature, and HDPE has a higher melting point and can be selected for higher protection temperature. As for the fluoropolymer, it is selected from the group consisting of polyvinylidene difluoride, polytetrafluoroethene, ethylene-tetrafluoroethylene copolymer, tetrafluoroethylene-hexafluoro-propylene copolymer, perfluoroalkoxy modified tetrafluoroethylenes, poly(chlorotri-fluorotetrafluoroethylene), vinylidene fluoride-tetrafluoroethylene copolymer, tetrafluoroethylene-perfluorodioxole copolymer, vinylidene fluoride-hexafluoropropylene copolymer, and vinylidene fluoride-hexafluoropropylene-tetrafluoroethylene terpolymer, and mixture or copolymer of combinations thereof. In an embodiment, the fluoropolymer is polyvinylidene difluoride (PVDF). PVDF may be selectively modified in physical/chemical properties itself so as to obtain a plurality of PVDF with different melt flow indexes but having the same melting point. For example, in terms of the adjustment of molecular weight of polymer, VDF monomers or oligomers can be polymerized to yield a first PVDF with a melt flow index ranging from 1.8 g/10 min to 2 g/10 min (referred to as "PVDF-1" hereinafter); VDF monomers or oligomers can be polymerized to yield a second PVDF with a melt flow index ranging from 2.5 g/10 min to 3.5 g/10 min (referred to as "PVDF-2" hereinafter); VDF monomers or oligomers can be polymerized to yield a third PVDF with a melt flow index ranging from 6 g/10 min to 7 g/10 min (referred to as "PVDF-3" hereinafter); or VDF monomers or oligomers can be polymerized to yield a fourth PVDF with a melt flow index ranging from 21 g/10 min to 23 g/10 min (referred to as "PVDF-4" hereinafter). Either PVDF-1, PVDF-2, PVDF-3, or PVDF-4 can be used in the present invention. The structure of IPN can be well-formed in the polymer matrix as long as the melt flow index is in the range from 1.9 g/10 min to 30 g/10 min. In an embodiment, the melt flow index of PVDF may be 2.5 g/10 min, 3.5 g/10 min, 7 g/10 min, 7.5 g/10 min, 7.9 g/10 min, 10 g/10 min, 15 g/10 min, 17 g/10 min, 19 g/10 min, 25 g/10 min, or 28 g/10 min. Under some circumstances, two or more PVDF with different melt flow indexes can be mixed together, such as mixing the PVDF-1 with the PVDF-2, or mixing the PVDF-1 with the PVDF-2 and PVDF-3. Accordingly, in an embodiment, the first fluoropolymer is selected from the group consisting of the first PVDF, the second PVDF, the third PVDF, the fourth PVDF, and any combination thereof.

As for conductive filler, in order to have better electrical conduction, the present invention uses the metal-ceramic compound, which has the electrical resistivity lower than 500 μΩ·cm, as the major constituent of the conductive filler, instead of using pure carbon black as the major conductive filler or even as the only conductive filler. In an embodiment, the total volume of the heat-sensitive layer 11 is calculated as 100%, and the metal-ceramic compound accounts for 35% to 45% by volume of the heat-sensitive layer 11. Concerning the specific material for implementation, the metal-ceramic compound may be selected from the group consisting of tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride, zirconium nitride, and any combination thereof. Considering the better performance of voltage endurance, the heat-sensitive layer 11 may further include a small amount of a second conductive filler. That is, the conductive filler includes the first conductive filler and the second conductive filler. The second conductive filler is carbon black, by which the over-current protection device 10 can withstand high applied voltage. For example, the total volume of the heat-sensitive layer 11 is calculated as 100%, and the metal-ceramic compound accounts for 35% to 45% and the carbon black accounts for 4% to 6% by volume of the heat-sensitive layer 11. In a preferred embodiment, the present invention finds that the combination including a large amount of a metal carbide (e.g., tungsten carbide) and a small amount of carbon black can lower the electrical resistivity of the over-current protection device 10 while providing excellent voltage endurance capability thereof.

In addition, in order to enhance the flame retardancy of the over-current protection device 10, the heat-sensitive layer 11 further includes a flame retardant. The total volume of the heat-sensitive layer 11 is calculated as 100%, and the flame retardant accounts for 1% to 3% by volume of the heat-sensitive layer 11. The flame retardant may be boron nitride, aluminum nitride, aluminium oxide, or magnesium hydroxide. In a system that the polymer matrix is mainly made of HDPE and the first conductive filler has the low electrical resistivity, the flame retardant is preferably a non-metal nitride, such as boron nitride described above.

Figure 2:
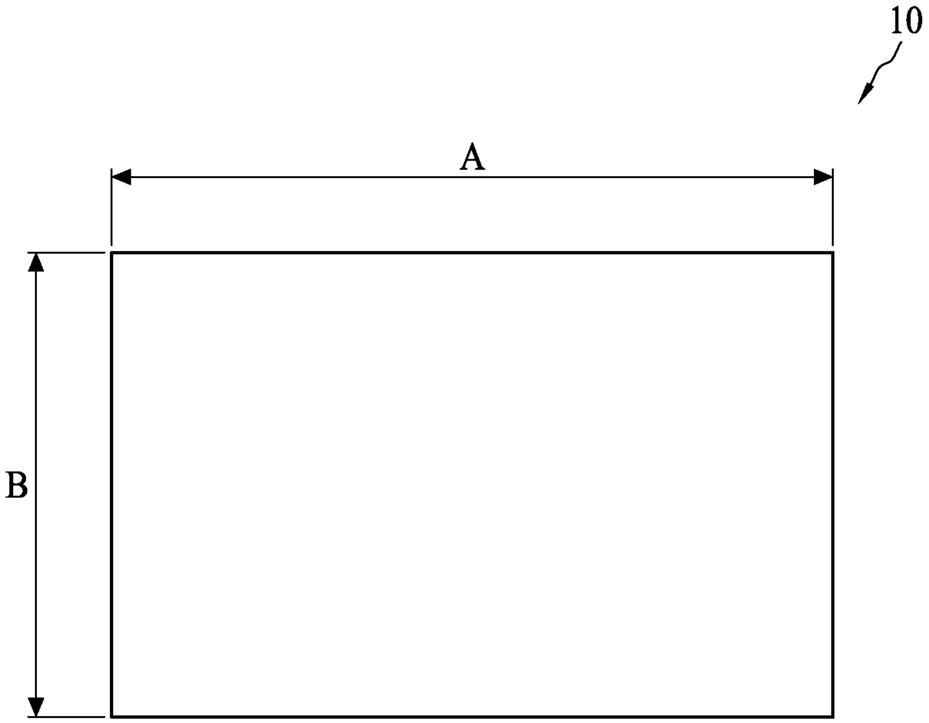
FIG. 2 shows the top view of the over-current protection device shown in FIG. 1.

The melt flow index of the fluoropolymer is precisely controlled, and therefore the over-current protection device 10 has the electrical resistivity (ρ) ranging from 0.015 Ω·cm to 0.019 Ω·cm and other excellent electrical characteristics. For example, the over-current protection device 10 has at least three excellent electrical characteristics (referred to as first electrical characteristic, second electrical characteristic, and third electrical characteristic hereinafter). The first electrical characteristic is a voltage-endurance value of at least 48V. Regarding the LR over-current protection device 10, the voltage-endurance value is merely 30V at most if the polymer matrix consists of the polyolefin-based polymer (e.g., pure HDPE). However, the present invention adds a small amount of the fluoropolymer having a specific melt flow index, and therefore the voltage-endurance value of the over-current protection device 10 is elevated to 48V. The second electrical characteristic is a ratio of resistance jump ranging from 4.8 to 6.2. The ratio of resistance jump can be an index for assessing the stability of electrical resistance of the over-current protection device. For example, the over-current protection device 10 has a first electrical resistance before the cycle life test under room temperature. After tripping of device with many cycles, the over-current protection device 10 has a second electrical resistance when cooled back to room temperature. A value obtained by dividing the second electrical resistance by the first electrical resistance is the ratio of resistance jump. The smaller the ratio of resistance jump is, the better the resistance recovery capability of the over-current protection device 10 will be. In a preferred embodiment, the cycle number of the cycle life test is 300, and the ratio of resistance jump is 4.8. The third electrical characteristic is an endurable power per unit area of the over-current protection device 10, and the details thereof are described below. FIG. 2 shows the top view of the over-current protection device shown in FIG. 1. The over-current protection device 10 has a length A and a width B, and the top-view area "A×B" of the over-current protection device 10 is substantially equivalent to the top-view area of the heat-sensitive layer 11. The heat-sensitive layer 11 may have a top-view area ranging from 30 mm 2 to 72 $mm^2$ based on different products having different sizes. For example, the top-view area "A×B" may be 5×6 $mm^2$, 5.1×6.1 $mm^2$, 5×7 $mm^2$, 7.62×7.62 $mm^2$, 8.2×7.15 $mm^2$, 7.62×9.35 $mm^2$, or 8×9 $mm^2$ Compared with conventional LR over-current protection device, the over-current protection device 10 of the present invention can withstand larger applied power. Taking the size of 5.1×6.1 $mm^2$ as an example, the endurable power per unit area of the over-current protection device 10 ranges from 6.7 W/$mm^2$ to 7.5 W/$mm^2$.

As described above, the present invention improves the electrical resistance characteristics of the over-current protection device 10. It could be verified according to the experimental data in Table 1 to Table 3 as shown below.

TABLE 1

Volume percentage (vol %) of the heat-sensitive layer 11.

| Group | HDPE | PVDF-1 | PVDF-2 | PVDF-3 | PVDF-4 | PVDF-5 | BN | CB | WC |
|---|---|---|---|---|---|---|---|---|---|
| E1 | 46.0 | 7.0 | | | | | 2.0 | 5.0 | 40.0 |
| E2 | 46.0 | | 7.0 | | | | 2.0 | 5.0 | 40.0 |
| E3 | 46.0 | | | 7.0 | | | 2.0 | 5.0 | 40.0 |
| E4 | 46.0 | | | | 7.0 | | 2.0 | 5.0 | 40.0 |
| E5 | 50.0 | | 3.0 | | | | 2.0 | 5.0 | 40.0 |
| E6 | 43.0 | | 10.0 | | | | 2.0 | 5.0 | 40.0 |
| C1 | 46.0 | | | | | 7.0 | 2.0 | 5.0 | 40.0 |
| C2 | 53.0 | | | | | | 2.0 | 5.0 | 40.0 |
| C3 | | | | | | 53.0 | 2.0 | 5.0 | 40.0 |

TABLE 2

Melt flow index of the fluoropolymer.

| Polymer | Melt flow index (g/10 min) |
|---|---|
| PVDF-1 | 1.958 |
| PVDF-2 | 3 |
| PVDF-3 | 6.5 |
| PVDF-4 | 22 |
| PVDF-5 | 1.602 |

Table 1 shows the composition to form the heat-sensitive layer 11 by volume percentages in accordance with the embodiments (E1-E6) of the present disclosure and the comparative examples (C1-C3). The first column in Table 1 shows test groups E1-C3 from top to bottom. The first row in Table 1 shows various materials used for the heat-sensitive layer 11 from left to right, that is, high-density polyethylene (HDPE), polyvinylidene difluoride (PVDF), boron nitride (BN), carbon black (CB), and tungsten carbide (WC). It is noted that there are five different types of PVDF (i.e., PVDF-1, PVDF-2, PVDF-3, PVDF-4, and PVDF-5) in the experiment, each of which has different melt flow index. As shown in Table 2, the melt flow index of the first PVDF (PVDF-1) is 1.958 g/10 min; the melt flow index of the second PVDF (PVDF-2) is 3 g/10 min; the melt flow index of the third PVDF (PVDF-3) is 6.5 g/10 min; the melt flow index of the fourth PVDF (PVDF-4) is 22 g/10 min; and the melt flow index of the fifth PVDF (PVDF-5) is 1.602 g/10 min. The melt flow index is measured at 230° C. in accordance with the standard of ASTM D1238. In addition, each group uses boron nitride as its flame retardant. In order to enhance electrical conduction, tungsten carbide is the major constituent (i.e., the first conductive filler) and carbon black is the minor constituent (i.e., the second conductive filler) of the conductive filler. The combination of tungsten carbide and carbon black may also be referred to as a type of LR system's conductive fillers. In other words, the composition of the present invention is aimed to the adjustment of physical/chemical properties of PVDF, and such adjustment is further verified when the polymer matrix is mainly made of HDPE and the conductive filler is under LR system.

In the embodiment E1 to the embodiment E6, the major constituent of the polymer matrix is HDPE, and the minor constituent of the polymer matrix is PVDF. The melting point of PVDF is about 170° C. to 178° C., which is much higher than HDPE, and therefore the proportion of PVDF should not be excessively high. Otherwise, the protection temperature and other unexpected issues relating to trip event of the over-current protection device are significantly affected. The proportion of HDPE relative to PVDF needs to be carefully controlled. More specifically, the proportion between HDPE and PVDF is in the range from 81:19 to 95:5. That is, the total volume of HDPE and PVDF is calculated as 100%, and HDPE accounts for 81% to 95% and PVDF accounts for 5% to 19%. It is noted that the proportion of the polymer matrix (i.e., HDPE and PVDF) in the heat-sensitive layer 11 also needs to be controlled in a specific range. If the proportion of the polymer matrix in the heat-sensitive layer 11 is too low, the overcurrent cannot be properly cut off. If the proportion of the polymer matrix in the heat-sensitive layer 11 is too high, electrical conduction of the device is poor under room temperature. Therefore, the polymer matrix accounts for at least half the heat-sensitive layer 11 by volume, such as 53% by volume of the heat-sensitive layer 11 in E1-E6 and C1-C3. It is understood that the same technical effect is obtained as long as the proportion of the polymer matrix is in the specific range from 50% to 60% by volume of the heat-sensitive layer 11.

In the comparative example C1, the polymer matrix is made of HDPE and PVDF, the same as in the embodiments E1 to E6. However, the comparative example C1 has a different type of PVDF (i.e., PVDF-5), and PVDF-5 in the comparative example C1 has a lower melt flow index. The flowability of the comparative example C1 in the melted state is better than that of the embodiments E1 to E6. Therefore, the experiment can compare the difference between PVDF with low melt viscosity of the comparative example C1 and PVDF with high melt viscosity of the present invention.

In the comparative examples C2 and C3, their polymer systems contain different polymer compositions from the embodiments E1 to E6. That is, the polymer matrix in the comparative example C2 is only made of HDPE, and the polymer matrix in the comparative example C3 is only made of PVDF (i.e., PVDF-5). Accordingly, the polymer in either the comparative example C2 or the comparative example C3 forms a network structure which is only made of single kind of polymer, rather than IPN structure.

According to the composition shown in Table 1, materials are formulated and put into HAAKE™ twin screw blender for blending. The blending temperature is 215° C., the time for pre-mixing is 3 minutes, and the blending time is 15 minutes. The conductive polymer after being blended is pressed into a sheet by a hot press machine at a temperature of 210° C. and a pressure of 150 kg/cm$^2$. The sheet is then cut into pieces of about 20 cm×20 cm, and two nickel-plated copper foils are laminated to two sides of the sheet with the hot press machine at a temperature of 210° C. and a pressure of 150 kg/cm$^2$, by which a three-layered structure is formed. Then, the sheet with the nickel-plated copper foils is punched into PTC chips, each of which is the over-current protection device of the present invention. Each sample of the over-current protection device has the length of 5.1 mm and the width of 6.1 mm (i.e., top-view area is 31.11 mm$^2$), and the thickness thereof is 0.82 mm. Then, the PTC chips of the embodiments E1 to E6 and comparative examples C1 to C3 are subjected to electron beam irradiation of 300 kGy (irradiation dose can be adjusted depending on the requirement). After irradiation, the following measurements are performed by taking five PTC chips as samples for each of the groups.

In the experiment, the voltage endurance capability of the over-current protection device is assessed through the cycle life test. One cycle of the cycle life test includes applying voltage/current at 48V/20 A for 10 seconds and turning it off for 60 seconds (i.e., on: 10 seconds; off: 60 seconds), by which it can be observed whether the over-current protection device would be burnt out or not after 300 cycles. Therefore, the related electrical characteristics can be assessed. It is understood that this experiment is intended to be illustrative only, and the scope of the present invention is not limited thereto. The results are shown in Table 3.

TABLE 3

Cycle life test.

| Group | $R_i$ (Ω) | ρ_$R_i$ (Ω · cm) | I-$T_{25° C.}$ (A) | I-$T_{25° C.}$/area (A/mm$^2$) | $P_{25° C.}$/area (W/mm$^2$) | $R_{300 C}$ (Ω) | $R_{300 C}/R_i$ |
|---|---|---|---|---|---|---|---|
| E1 | 0.00482 | 0.0183 | 4.40 | 0.141 | 6.79 | 0.02302 | 4.8 |
| E2 | 0.00428 | 0.0163 | 4.48 | 0.144 | 6.91 | 0.02495 | 5.8 |
| E3 | 0.00436 | 0.0165 | 4.58 | 0.147 | 7.07 | 0.02645 | 6.1 |
| E4 | 0.00408 | 0.0155 | 4.80 | 0.154 | 7.41 | 0.02470 | 6.0 |
| E5 | 0.00402 | 0.0152 | 4.43 | 0.142 | 6.84 | 0.02298 | 5.7 |
| E6 | 0.00421 | 0.0160 | 4.38 | 0.141 | 6.76 | 0.02593 | 6.2 |
| C1 | 0.00442 | 0.0168 | 4.48 | 0.144 | — | — | — |
| C2 | 0.00438 | 0.0166 | 4.20 | 0.135 | — | — | — |
| C3 | 0.00614 | 0.0233 | 3.90 | 0.125 | — | — | — |

In Table 3, the first row shows items to be tested from left to right.

"$R_i$" refers to initial electrical resistance of the over-current protection device at room temperature. Moreover, the electrical resistance formula is ρ=R×A/L. "R" is electrical resistance, "L" is length (thickness), and "A" is cross sectional area. Accordingly, the electrical resistivity of ρ_$R_i$ can be calculated corresponding to $R_i$.

"I-$T_{25° C.}$" refers to trip current of the over-current protection device under the environmental temperature of 25° C.

"I-$T_{25° C.}$/area" refers to trip current per unit area of the over-current protection device under the environmental temperature of 25° C.

"$P_{25° C.}$/area" refers to endurable power per unit area of the over-current protection device under the environmental temperature of 25° C.

"$R_{300}$" refers to the electrical resistance of the over-current protection device after 300 cycles of the cycle life test, the electrical resistance of which is then measured when cooled back to room temperature. Therefore, a ratio of resistance jump ($R_{300C}/R_i$) after 300 cycles of the cycle life test can be calculated. The smaller the value (ratio of resistance jump) is, the better the resistance recovery capability of the over-current protection device will be. In other words, the ratio of resistance jump can be an index for assessing the stability of electrical resistance.

In the embodiments E1 to E6, PVDF is selected as the minor constituent of the polymer matrix, and its melt flow index is at least higher than 1.9 g/10 min. In this way, HDPE and PVDF together form a stable structure of IPN, by which the over-current protection device can withstand 300 cycles of the cycle life test without burnout, and most importantly, the structure of IPN does not adversely affect electrical conduction (i.e., $\rho\_R_i$) and threshold of trip event (i.e., $I\text{-}T_{25^\circ C.}$). More specifically, even though a plurality of PVDF with specified melt flow indexes are additionally added in the embodiments E1 to E6, they can still remain low electrical resistivity (i.e., 0.0152 Ω·cm to 0.0183 Ω·cm) similar to that of the conventional over-current protection devices (i.e., comparative examples C1 to C3); and also, their trip current under room temperature ($I\text{-}T_{25^\circ C.}$) remains in the similar range from 4.38 A to 4.80 A so that the embodiments can be applied to the apparatuses with similar protection requirement (i.e., the desired trip current). Furthermore, besides the similar application requirement, the embodiments E1 to E6 are capable of withstanding higher applied voltage (repeated 300 times) without burnout. Accordingly, in Table 3, the endurable power per unit area ($P_{25^\circ C.}$/area), the electrical resistance after the cycle life test ($R_{300}$), and the ratio of resistance jump ($R_{300C}/R_i$) of the embodiments E1 to E6 can be calculated under the applied voltage/current at 48V/20 A. In the embodiments E1 to E6, the endurable power per unit area ($P_{25^\circ C.}$/area) ranges from about 6.7 W/mm$^2$ to 7.5 W/mm$^2$; the electrical resistance after the cycle life test ($R_{300}$) ranges from about 0.022Ω to 0.027Ω; and the ratio of resistance jump ($R_{300C}/R_i$) ranges from about 4.8 to 6.2. The embodiment E1 has the best ratio of resistance jump ($R_{300C}/R_i$), which is 4.8, and it means that the embodiment E1 has the best resistance recovery capability and its electrical resistance is most stable. In contrast, the comparative examples C1 to C3 cannot pass the cycle life test and the over-current protection devices in the comparative examples C1 to C3 are all burnt out under the test condition of 48V/20 A, and therefore their resultant values of the aforementioned three items cannot be obtained.

It is noted that in the comparative example C1, although its polymer matrix has PVDF, the melt flow index of PVDF is so low that the structure of IPN is formed in a small proportion or even not formed between HDPE/PVDF, thereby leading to phase separation therebetween. As a result, the comparative example C1 cannot pass the cycle life test although it has a low electrical resistivity and desired trip current similar to other test groups. In the comparative example C2, the polymer matrix is made of HDPE only—that is, there is no PVDF in the polymer matrix. In the absence of PVDF, the thermal stability of the over-current protection device is compromised, and therefore the integrity of entire structure and stability of electrical resistance are susceptible to high temperature coming from the trip event. Accordingly, the comparative example C2 cannot withstand the high voltage over repeated cycles. As for the comparative example C3, the polymer matrix is made of PVDF-5 only—that is, there is no HDPE in the polymer matrix. In the absence of HDPE, recrystallization behavior of the polymer matrix is weakened because the crystallinity of PVDF is much lower than that of HDPE. The crystallinity of HDPE is about 70%, and the crystallinity of PVDF is about 30% to 50%. During the trip event, the proportion of amorphous phase in the polymer matrix increases owing to the high temperature, and it is understood that the molecules in amorphous phase are arranged in random orientation which makes it less stable. If the crystallinity is too low, the behavior of recrystallization from amorphous phase to crystalline phase is weakened in the polymer matrix. Therefore, the voltage endurance capability of the over-current protection device in C3 is significantly affected by the less stable structure.

From the above, the present invention provides a LR over-current protection device, and focuses on the improvement of the polymer matrix. In the polymer matrix, the polyolefin-based polymer is selected as the major constituent, and the fluoropolymer is selected as the minor constituent in order to enhance thermal stability. In addition, the melt flow index of the fluoropolymer is carefully controlled in a specific range, by which the polyolefin-based polymer and the fluoropolymer can easily and stably form the structure of IPN. The structure of IPN enhances the compatibility between the polyolefin-based polymer and the fluoropolymer, and therefore the issue of phase separation therebetween is prevented. The stability of entire structure of the over-current protection device is enhanced, thereby improving the voltage endurance capability.

The above-described embodiments of the present invention are intended to be illustrative only. Numerous alternative embodiments may be devised by persons skilled in the art without departing from the scope of the following claims.

What is claimed is:

1. An over-current protection device, comprising:

a first metal layer;

a second metal layer; and a heat-sensitive layer laminated between the first metal layer and the second metal layer, the heat-sensitive layer exhibiting a positive temperature coefficient (PTC) characteristic and comprising:

a polymer matrix comprising a polyolefin-based polymer and a fluoropolymer, wherein the fluoropolymer has a melt flow index ranges from 1.9 g/10 min to 30 g/10 min, and the polyolefin-based polymer and the fluoropolymer together form an interpenetrating polymer network (IPN), and wherein the total volume of the heat-sensitive layer is calculated as 100%, and the polyolefin-based polymer accounts for 42% to 51% and the fluoropolymer accounts for 2% to 11% by volume of the heat-sensitive layer; and a first conductive filler having an electrical resistivity lower than 500 μΩ·cm and dispersed in the polymer matrix, thereby forming an electrically conductive path in the heat-sensitive layer.

2. The over-current protection device of claim 1, wherein the total volume of the heat-sensitive layer is calculated as 100%, and the polymer matrix accounts for 50% to 60% by volume of the heat-sensitive layer.

3. The over-current protection device of claim 2, wherein the first conductive filler is a metal-ceramic compound, wherein the total volume of the heat-sensitive layer is calculated as 100%, and the metal-ceramic compound accounts for 35% to 45% by volume and is selected from the group consisting of tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride, zirconium nitride, and any combination thereof.

4. The over-current protection device of claim 3, wherein the heat-sensitive layer further comprises a second conductive filler, and the second conductive filler is carbon black, wherein the total volume of the heat-sensitive layer is calculated as 100%, and the carbon black accounts for 4% to 6% by volume of the heat-sensitive layer.

5. The over-current protection device of claim 4, further comprising a flame retardant consisting of a non-metal nitride, wherein the total volume of the heat-sensitive layer is calculated as 100%, and the flame retardant accounts for 1% to 3% by volume of the heat-sensitive layer.

6. The over-current protection device of claim 5, wherein the flame retardant is boron nitride.

7. The over-current protection device of claim 1, wherein the polyolefin-based polymer is selected from the group consisting of high-density polyethylene (HDPE), medium-density polyethylene (MDPE), low-density polyethylene (LDPE), polyvinyl wax, vinyl polymer, polypropylene, polybutene, polyvinyl chlorine, and mixture or copolymer of combinations thereof.

8. The over-current protection device of claim 7, wherein the fluoropolymer is selected from the group consisting of polyvinylidene difluoride, polytetrafluoroethene, ethylene-tetrafluoroethylene copolymer, tetrafluoroethylene-hexafluoro-propylene copolymer, perfluoroalkoxy modified tetrafluoroethylenes, poly(chlorotri-fluorotetrafluoroethylene), vinylidene fluoride-tetrafluoroethylene copolymer, tetrafluoroethylene-perfluorodioxole copolymer, vinylidene fluoride-hexafluoropropylene copolymer, and vinylidene fluoride-hexafluoropropylene-tetrafluoroethylene terpolymer, and mixture or copolymer of combinations thereof.

9. The over-current protection device of claim 1, wherein the over-current protection device has an electrical resistivity (p) ranging from 0.015 Ω·cm to 0.019 Ω·cm.

10. The over-current protection device of claim 9, wherein the over-current protection device has a first electrical characteristic, and the first electrical characteristic is a voltage-endurance value of at least 48V.

11. The over-current protection device of claim 10, wherein the over-current protection device has a second electrical characteristic, and the second electrical characteristic is a ratio of resistance jump ranging from 4.8 to 6.2.

12. The over-current protection device of claim 11, wherein the over-current protection device has a third electrical characteristic, and the third electrical characteristic is an endurable power per unit area ranging from 6.7 $W/mm^2$ to 7.5 $W/mm^2$.

* * * * *